US 9,790,806 B2

(12) United States Patent
Champion et al.

(10) Patent No.: US 9,790,806 B2
(45) Date of Patent: Oct. 17, 2017

(54) CASE WITH VANE RETENTION FEATURE

(71) Applicant: UNITED TECHNOLOGIES CORPORATION, Hartford, CT (US)

(72) Inventors: Nathan F. Champion, Enfield, CT (US); Stephen H. Mattia, Middletown, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 189 days.

(21) Appl. No.: 14/731,676

(22) Filed: Jun. 5, 2015

(65) Prior Publication Data
US 2016/0017745 A1    Jan. 21, 2016

Related U.S. Application Data

(60) Provisional application No. 62/008,742, filed on Jun. 6, 2014.

(51) Int. Cl.
F01D 5/02 (2006.01)
F01D 17/16 (2006.01)
F01D 21/04 (2006.01)
F01D 25/24 (2006.01)
F01D 9/04 (2006.01)

(52) U.S. Cl.
CPC ............... F01D 17/16 (2013.01); F01D 5/02 (2013.01); F01D 9/041 (2013.01); F01D 17/162 (2013.01); F01D 21/04 (2013.01); F01D 25/24 (2013.01); F01D 25/246 (2013.01); F05D 2220/32 (2013.01); F05D 2240/12 (2013.01); F05D 2270/101 (2013.01); Y02T 50/671 (2013.01)

(58) Field of Classification Search
None
See application file for complete search history.

(56) References Cited

U.S. PATENT DOCUMENTS

| 3,079,128 A | 2/1963 | Burge |
| 3,303,992 A | 2/1967 | Johnson |
| 3,423,071 A | 1/1969 | Noren |
| 4,314,792 A | 2/1982 | Chaplin |

(Continued)

FOREIGN PATENT DOCUMENTS

| EP | 0357984 A1 | 3/1990 |
| EP | 1712744 A1 | 10/2006 |

(Continued)

OTHER PUBLICATIONS

The European Search Report for U.S. Appl. No. 14/731,676, dated Feb. 16, 2016.

(Continued)

Primary Examiner — Dwayne J White
Assistant Examiner — Theodore Ribadeneyra
(74) Attorney, Agent, or Firm — Carlson, Gaskey & Olds, P.C.

(57) ABSTRACT

One exemplary aspect of this disclosure relates to an assembly for a gas turbine engine having an engine axis. The assembly includes a case including an integrally formed projection configured to extend transverse to the engine axis. The assembly further includes an engine component including a flange configured for contact with the projection to limit motion of the component along the engine axis.

16 Claims, 2 Drawing Sheets

(56) References Cited

U.S. PATENT DOCUMENTS

| | | | |
|---|---|---|---|
| 4,723,889 A * | 2/1988 | Charreron | F01D 5/22 |
| | | | 416/193 A |
| 5,328,327 A * | 7/1994 | Naudet | F01D 17/162 |
| | | | 29/889.22 |
| 5,636,968 A | 6/1997 | Audet et al. | |
| 5,785,492 A | 7/1998 | Belsom et al. | |
| 5,796,199 A | 8/1998 | Charbonnel | |
| 7,094,026 B2 * | 8/2006 | Coign | F01D 9/023 |
| | | | 415/189 |
| 7,121,727 B2 | 10/2006 | Bruce et al. | |
| 7,854,586 B2 | 12/2010 | Major et al. | |
| 2006/0140755 A1 | 6/2006 | Schwarz et al. | |
| 2006/0198982 A1 * | 9/2006 | Holland | F01D 9/042 |
| | | | 428/66.6 |
| 2007/0020091 A1 * | 1/2007 | Giaimo | F01D 11/001 |
| | | | 415/160 |
| 2008/0184694 A1 * | 8/2008 | Guimbard | F01D 1/26 |
| | | | 60/224 |
| 2008/0260520 A1 | 10/2008 | Hettinger et al. | |
| 2009/0208338 A1 | 8/2009 | Major et al. | |
| 2011/0110773 A1 * | 5/2011 | Domercq | F01D 17/162 |
| | | | 415/191 |
| 2011/0250061 A1 | 10/2011 | Blanchard et al. | |
| 2012/0263571 A1 * | 10/2012 | Ress, Jr. | F01D 17/162 |
| | | | 415/1 |
| 2013/0052024 A1 | 2/2013 | Brunt et al. | |
| 2013/0186056 A1 * | 7/2013 | Gerez | F01D 21/04 |
| | | | 60/39.091 |
| 2014/0294579 A1 * | 10/2014 | Jansson | F01D 9/04 |
| | | | 415/208.1 |

FOREIGN PATENT DOCUMENTS

| | | |
|---|---|---|
| EP | 1586744 B1 | 12/2010 |
| EP | 2261467 A2 | 12/2010 |
| EP | 2390472 A2 | 11/2011 |

OTHER PUBLICATIONS

Partial European Search Report for European Patent Application No. 15170807.0 dated Nov. 3, 2015.

* cited by examiner

CASE WITH VANE RETENTION FEATURE

STATEMENT REGARDING GOVERNMENT SUPPORT

This invention was made with government support under Contract No. FA8650-09-D-DO0021 awarded by the United States Air Force. The government has certain rights in this invention.

BACKGROUND

Gas turbine engines typically include a compressor section, a combustor section, and a turbine section. During operation, air is pressurized in the compressor section, and mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections include alternating arrays of rotating blades and stationary vanes that extend into a core airflow path of the gas turbine engine. During a surge condition, wherein fluid in the core airflow path flows opposite the intended direction, it is possible for the stationary vanes to move axially and cause damage to adjacent components. One example system for limiting vane movement is in U.S. Pat. No. 7,854,586, assigned to United Technologies Corporation and hereby incorporated by reference in its entirety. In the '586 patent, an arm 94, which is formed separately from an engine case 28, is attached to the case 28 to prevent undesired vane movement.

SUMMARY

One exemplary aspect of this disclosure relates to an assembly for a gas turbine engine having an engine axis. The assembly includes a case including an integrally formed projection configured to extend transverse to the engine axis. The assembly further includes an engine component including a flange configured for contact with the projection to limit motion of the component along the engine axis.

In a further non-limiting embodiment of the foregoing assembly, the case and the projection are monolithically formed.

In a further non-limiting embodiment of the foregoing assembly, the engine component includes at least one vane.

In a further non-limiting embodiment of the foregoing assembly, the at least one vane includes a plurality of variable area vanes.

In a further non-limiting embodiment of the foregoing assembly, each vane includes a respective platform having a respective flange, and each of the flanges contacts the projection.

In a further non-limiting embodiment of the foregoing assembly, the assembly further includes a plurality of rotor blades downstream of the vanes.

In a further non-limiting embodiment of the foregoing assembly, an aft surface of the flange is configured to contact a fore surface of the projection.

In a further non-limiting embodiment of the foregoing assembly, the aft surface of the flange and the fore surface of the projection are configured for contacting one another along an inclined interface relative to the engine axis.

In a further non-limiting embodiment of the foregoing assembly, the inclined interface is inclined at an acute angle relative to the engine axis.

In a further non-limiting embodiment of the foregoing assembly, the case is configured to be mounted adjacent a low pressure compressor and a high pressure compressor of the engine.

Another exemplary aspect of this disclosure relates to a case for a gas turbine engine having an engine axis. The case includes a stop monolithically formed with the case and configured to circumferentially extend about the engine axis with a fore surface of the stop oriented at an angle relative to the engine axis.

In a further non-limiting embodiment of the foregoing case, wherein the stop extends from a main body of the case to a free end.

In a further non-limiting embodiment of the foregoing case, the stop is configured to contact a flange of an engine component to limit axial movement thereof.

In a further non-limiting embodiment of the foregoing case, the stop is oriented at an acute angle relative to the engine axis.

Yet another exemplary aspect of this disclosure relates to a component for a gas turbine engine having an engine axis. The component includes an inner platform including a flange. The flange projects from a radially inner surface of the inner platform, and the flange is configured to be mounted in the engine with an aft surface thereof oriented at an angle relative to the engine axis.

In a further non-limiting embodiment of the foregoing component, the component is a variable area vane.

In a further non-limiting embodiment of the foregoing component, the vane includes an airfoil section, a root section, and a bushing adjacent the root section. The bushing is configured to radially retain the root section while allowing rotation of the root section.

In a further non-limiting embodiment of the foregoing component, the root section is configured for rotation about an axis normal to the engine axis.

In a further non-limiting embodiment of the foregoing component, the flange is configured to contact a retainer of a case.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
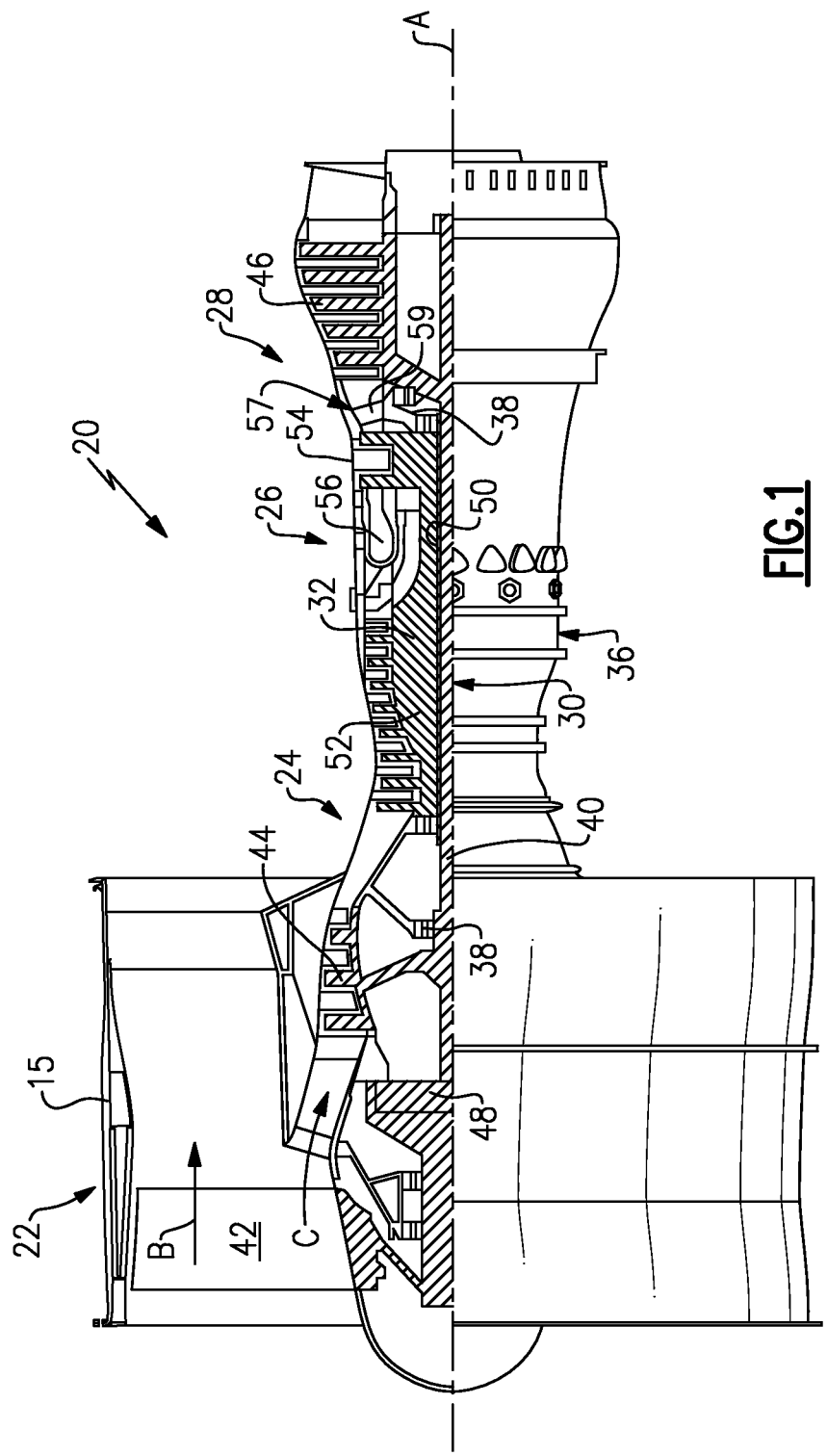
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2:
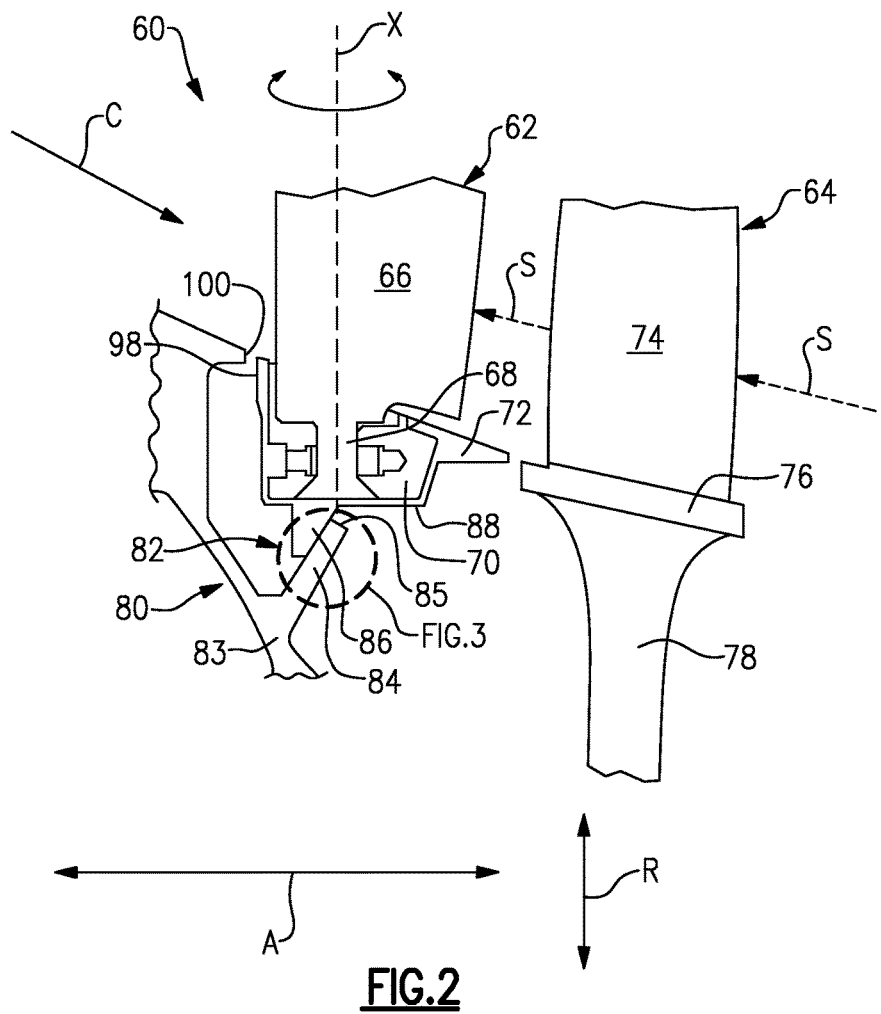
FIG. 2 is a partial, cross-sectional view of a section of an example gas turbine engine.

FIG. 2 is a partial, schematic view of a section 60 of the engine 20. In this example, the section 60 includes an array of vanes 62 and an array of blades 64 downstream of the vanes 62. The vanes 62 each include an airfoil section 66 projecting into the core airflow path C, and a root section 68. The vanes 62 in this example are variable area vanes. That is, the vanes 62 are rotatable about an axis X, which extends parallel to a radial direction R (which is normal to the engine central longitudinal axis A) to vary the effective area of the core airflow path C. The root section 68 is rotatable relative to a bushing 70, which also radially retains the root section 68. The bushing 70 is provided within an inner platform 72. While variable area vanes are shown, this disclosure extends to other types of vanes.

The blades 64 each include an airfoil section 74 projecting into the core airflow path C from an inner platform 76. The inner platform 76 is connected to a disk 78, which is configured to rotate about the engine central longitudinal axis A.

In order to prevent unwanted axial movement of the vanes 62, a case 80 of the engine 20 includes a retainer 82. In this example, the retainer 82 includes a projection 84 which functions as a retainer or stop as further discussed below. The case 80 is an intermediate case in this example, and is located between the low pressure compressor 44 and the high pressure compressor 52. This disclosure is not limited to intermediate cases, however.

In accordance with various embodiments, the case 80 is integrally or monolithically formed with the retainer 82. That is, the case 80 and the projection 84 can be formed as a single, monolithic structure, without mechanical joints or seams. In one example, the case 80 and the projection 84 are formed together as part of the same casting process. While FIG. 2 only illustrates the case 80 in cross section, the case 80 and the projection 84 circumferentially extend about the engine central longitudinal axis A. In one example, the case 80 and the projection 84 are annular, and extend around the entirety of the engine central longitudinal axis A. It is also possible to scallop adjacent sections of the case 80, which may provide a weight reduction. That is, a single projection 84 may contact more than one vane 62.

Figure 3:
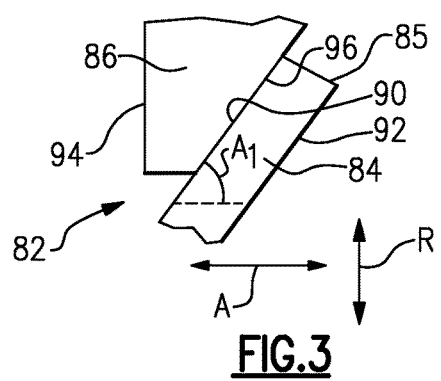
FIG. 3 is a close-up view of the encircled area in FIG. 2.

The projection 84 contacts a flange 86 projecting from a radially inner surface 88 of the inner platforms 72 to limit vane movement. The projection 84, in this example, extends generally in an aft direction (to the right in FIG. 2) from a main body 83 of the case 80 to a free end 85. Further, as illustrated in FIG. 3, the projection 84 includes a fore surface 90 and an aft surface 92. The fore surface 90 is inclined at an angle $A_1$ relative to the engine central longitudinal axis A.

The flange 86 includes a fore surface 94 and an aft surface 96, which is also inclined at the angle $A_1$. The angle $A_1$, in one example, is non-parallel with the engine central longitudinal axis A. That is, $A_1$ is greater than 0° and less than 90°. In one example, the angle $A_1$ is approximately 60°.

As illustrated, the fore surface 90 of the projection 84 is in direct contact with the aft surface 96 of the flange 86. The surfaces 90 and 96 provide a bearing surface between the flange 86 and the projection 84, which prevents the vanes 62 from moving in an aft direction (to the right in FIG. 2) during a surge condition, for example, and thus prevents damage to adjacent engine components, such as the blades 64.

In a surge condition, the flow of fluid within the core airflow path C reverses. A reversal of flow is illustrated in phantom at S in FIG. 2. In a surge condition, the vanes 62 may deflect in a fore direction (to the left in FIG. 2), such that a fore face 98 of the inner platform 72 contacts an aft face 100 of the case 80. Absent retaining projection 84, such contact between faces 98, 100 may cause the vanes 62 to subsequently move in an axially aft direction toward the rotor blades 64, which may cause damage to the rotor blades 64 and other engine components.

The retainer 82 prevents unwanted axial movement of the vane 62, and thus prevents the vane 62 from damaging the engine during a surge condition. Further, because the retaining projection 84 is monolithically formed with the case 80, ease of assembly is increased, and weight is reduced (due to the elimination of additional parts, scalloping adjacent case sections, etc.). The inclined surfaces 90, 96 also increase the ease of aligning the flange 86 and projection 84 during assembly, during which the vane 62 may be loaded from a radial outer location.

It should be understood that terms such as "fore," "aft," "axial," and "radial," are used above with reference to the normal operational attitude of the engine 20. Further, these terms have been used herein for purposes of explanation, and should not be considered otherwise limiting. Terms such as "approximately" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. An assembly for a gas turbine engine having an engine axis, the assembly comprising:
    a case including an integrally formed projection configured to extend transverse to the engine axis; and
    a stator vane including a flange configured for contact with the projection to limit motion of the stator vane along the engine axis, wherein the flange is positioned axially between the case and the projection, and wherein an aft surface of the flange and a fore surface of the projection are configured for contacting one another along an inclined interface relative to the engine axis.

2. The assembly as recited in claim 1, wherein the case and the projection are monolithically formed.

3. The assembly as recited in claim 1, wherein the stator vane includes a platform having the flange.

4. The assembly as recited in claim 1, further comprising a plurality of rotor blades downstream of the stator vane.

5. The assembly as recited in claim 1, wherein an aft surface of the flange is configured to contact a fore surface of the projection.

6. The assembly as recited in claim 1, wherein the case is configured to be mounted adjacent a low pressure compressor and a high pressure compressor of the engine.

7. An assembly for a gas turbine engine having an engine axis, the assembly comprising:
    a case including an integrally formed projection configured to extend transverse to the engine axis; and
    an engine component including a flange configured for contact with the projection to limit motion of the component along the engine axis, wherein an aft surface of the flange is configured to contact a fore surface of the projection, and wherein the aft surface of the flange and the fore surface of the projection are configured for contacting one another along an inclined interface relative to the engine axis.

8. The assembly as recited in claim 7, wherein the inclined interface is inclined at an acute angle relative to the engine axis.

9. A case for a gas turbine engine having an engine axis, the case comprising:
    a stop monolithically formed with the case and configured to circumferentially extend about the engine axis with a fore surface of the stop oriented at an angle relative to the engine axis, wherein the stop is oriented at an acute angle relative to the engine axis.

10. The case as recited in claim 9, wherein the stop extends from a main body of the case to a free end.

11. The case as recited in claim 9, wherein the stop is configured to contact a flange of an engine component to limit axial movement thereof.

12. A component for a gas turbine engine having an engine axis, the component comprising:
    an inner platform including a flange, the flange projecting from a radially inner surface of the inner platform, wherein the flange is configured to be mounted in the engine with an aft surface thereof inclined at an acute angle relative to the engine axis.

13. The component as recited in claim 12, wherein the component is a variable area vane.

14. The component as recited in claim 13, wherein the vane includes
    an airfoil section;
    a root section; and
    a bushing adjacent the root section, the bushing configured to radially retain the root section while allowing rotation of the root section.

15. The component as recited in claim 14, wherein the root section is configured for rotation about an axis normal to the engine axis.

16. The component as recited in claim 12, wherein the flange is configured to contact a retainer of a case.

* * * * *